US005586607A

United States Patent [19]

Neumaier et al.

[11] Patent Number: 5,586,607

[45] Date of Patent: Dec. 24, 1996

[54] MANUALLY OPERATED CHIPPING TOOL

[75] Inventors: Anton Neumaier, Fürstenfeldbruck; Hans-Christian Donner, Karlsfeld, both of Germany

[73] Assignee: Hilti Aktiengesellschaft, Furstentum, Liechtenstein

[21] Appl. No.: 428,756

[22] Filed: Apr. 25, 1995

[30] Foreign Application Priority Data

Apr. 25, 1994 [DE] Germany .......................... 44 14 342.7

[51] Int. Cl.[6] ............................ B25D 17/00; B23D 79/00

[52] U.S. Cl. ............................................ 173/117; 173/121

[58] Field of Search .............................. 173/117, 51, 121, 173/122

[56] References Cited

FOREIGN PATENT DOCUMENTS

| | | |
|---|---|---|
| 3417735 | 7/1989 | Germany . |
| 2142267 | 1/1985 | United Kingdom . |

*Primary Examiner*—Douglas D. Watts

*Attorney, Agent, or Firm*—Anderson Kill & Olick P.C.

[57] ABSTRACT

A manually operated tool for chipping material from a surface includes a plurality of axially extending needle-type chisels (8) located within a housing (1) and guided in a needle cage (12) positioned within the housing. The needle cage (12) is freely axially displaceable between a stop shoulder (**15*b*) of a guide sleeve (14) and an anvil (17) both of which are axially displaceable within the housing. The guide sleeve (14) is pressed by a compression spring (16) against the anvil (17**).

9 Claims, 2 Drawing Sheets

MANUALLY OPERATED CHIPPING TOOL

BACKGROUND OF THE INVENTION

The present invention is directed to a manually operated chipping tool for removing material from a surface using several needle-type chisels or cutters and a housing containing a needle cage, an anvil indirectly abutting against the housing through a compression spring, and a hammer for striking the anvil, all arranged to move parallel to the axial extent of the needle type chisels. The needle cage has a plurality of bores through which the needle-type chisels extend.

Manually operated tools for removing material from a surface or for machining a surface are known. These known manually-operated tools include a housing in which a striking mechanism and an axially displaceable needle cage are arranged. The needle cage has a number of bores through which the needle-type chisels or cutters extend and project outwardly from the housing.

The striking mechanisms in these known manually operated tools can be placed in motion by different media, in particular such as compressed air and liquid. A hammer of the striking mechanism applies blows to an anvil which, in turn, directs blows against the needle-type chisels. Considerable heating is produced in the bores of the needle cage in the region of the needle heads during the axial displacement of the needle-type chisels.

Since the operating media penetrates at least partially into the manually operated tool when it is operated, the parts located within the housing are cooled, so that damage to the needle-type chisels in the region of the needle heads or the needle cage is avoided.

A manually operated tool is disclosed in DE-PS 34 17 735 in which a number of needle type chisels are arranged next to one another in a parallel manner in a needle cage displaceable in a housing. The cage is provided with bores through which the needle-type chisels extend. A compression spring located in the housing presses against an edge or margin of the needle cage and presses it against an anvil. A reciprocating motion of the anvil is achieved by a reciprocating hammer which is part of a striking mechanism powered by an electric drive motor. The drive motor is supported in the housing of the manually operated chisel and is controlled by an actuation switch located in the region of a handle. The needle-type chisels are axially displaceable in the bores extending through the needle cage. The axial displacement of the chisels is obtained by the anvil located behind the needle-type chisels and displaced relative to them in an axially parallel manner, so that when the anvil is driven it strikes against the needle heads of the needle-type chisels.

During the operation of the tool, the needle-type chisels are pressed against the surface of a work piece, whereby the needle-type chisels are displaced axially relative to the needle cage in the rear end direction of the tool until the needle heads of the chisels come to rest at the anvil. When the drive motor is operated, blows are directed from the striking mechanism to the hammer which transmits such striking action against the anvil, whereby the needle-type chisels are driven in the forward direction at a very high speed and upon contacting the surface being worked on rebound in the axial direction. This axial displacement of the needle-type chisels occurs very rapidly, so that high friction is generated between the chisels and the bores through the needle cage. This reaction heats the needle cage and the chisels to a very considerable extent and entails damage to the needle cage and the chisels.

In this known manually operated tool, the striking mechanism also generates heat when the tool is operated which heat is generated in particular by the compression of air and such heat can not be dissipated at the rate at which it is generated. Accordingly, such heat generated within the manually operated tool causes an additional heating of the anvil, the needle cage and the needle-type chisels and further promotes the above-mentioned damage.

SUMMARY OF THE INVENTION

Therefore, the primary object of the present invention is to provide a manually operated tool which chips material off surfaces, and where the heating of the needle cage as well as of the needle-type chisels capable of resulting in damage, is prevented.

In the present invention, the needle cage is freely displaceable within the housing between the anvil and a stop shoulder.

The invention permits the use of low weight and reduced quality material for fabricating the needle cage.

Since the needle cage can move axially back and forth in a free manner and essentially with the same frequency as the needle-type chisels, only a slight axial displacement of the needle-type chisels occurs relative to the needle cage. Accordingly, for all intents and purposes, no friction leading to heating of the needle cage occurs between the needle-type chisels and the needle cage.

Preferably, the stop shoulder limiting the movement of the needle cage in the axial direction of the chisels is located at the housing. The stop shoulder can be formed as a radially inwardly projecting portion of the housing, or it can be part of a radially inwardly projecting stop element axially fixed to the housing.

An economically fabricated stop shoulder, limiting the axial displacement of the needle cage within the housing, is preferably part of the compression spring. Parts of the compression spring extending radially inwardly cooperate with the striking direction end face or with the striking direction side stop faces of the needle cage.

The axial displacement of the needle cage in the blow or striking direction is limited by a stop shoulder which expedially cooperates with a guide sleeve serving to guide the needle cage and disposed between the compression spring and the anvil. The arrangement of a guide sleeve, in which the needle cage is freely axially movable, enables the manufacture of a short length manually operated tool.

Preferably, the stop shoulder is formed by a base with an opening at the leading end of the guide sleeve, that is at the opposite end from the anvil. At the opposite or trailing end of the guide sleeve axial displacement of the needle cage is limited by the anvil.

To assure proper guidance of the needle-type chisels, a projecting section extends axially forward on the needle cage, that is, at the end spaced from the anvil, and the projecting section has a cross-section smaller than the cross section of the opening in the base of the guide sleeve. The projecting section forms an increased length of the needle cage, whereby the needle cage bores have a greater length. Accordingly, longer guiding regions are afforded for the needle-type chisels. At its leading end, the needle cage bears with its circumferentially extending edge region at the base of the guide sleeve. The projecting section extends through the opening in the base of the guide sleeve towards the leading end of the housing.

To achieve a smooth axial displacement of the needle cage along with the needle-type chisels within the guide sleeve, the needle cage is formed of plastic material.

It is necessary that the anvil is pressed into the working position by the biasing force of the compression spring and that the striking mechanism is continuously maintained in striking operation, so that the striking mechanism or hammer can apply blows to the anvil. The compression spring, laterally enclosing the needle-type chisels, extends axially between the housing and the guide sleeve. The anvil and the guide sleeve are axially displaceable within the housing and the guide sleeve is pressed opposite to the striking direction against the anvil by the biasing force of the compression spring. The compression spring is formed as a helical spring.

Since the needle-type chisels are subject to wear, during the operation of the tool, the chisels must be replaced as they wear out. Accordingly, the needle cage and the needle-type chisels are arranged within the housing so as to be replaced, and expediently the housing is formed of a first housing part and a second housing part coupled together. Preferably the first and second housing parts are coupled by a bayonet lock.

Preferably, the second housing part laterally encloses the first housing part at least partially when they are coupled together with inwardly extending projections on the second housing part cooperating with stops on the first housing part to form the bayonet lock. To disconnect the two housing parts, they are pressed together against the force of a compression spring and turned relative to one another to move the projections out of engagement with the stops.

The axially displaceable guide sleeve, the anvil, the compression spring and a dampening element in the form of an O-ring are located within the first housing part along with the needle cage and the needle-type chisels.

Both of the housing parts are at least partially enclosed by a sleeve forming a gripping area. An axially displaceable clamping piece is located at the leading end region of the second housing part. The clamping piece serves to adjust the extent to which the needles project from the housing and the clamping piece is positioned by a clamping device.

The two housing parts can be formed as a unit detachably mounted in the manually operated tool by a quick release lock. This quick release lock can be based on a ball-coupling, wherein a radially displaceable locking element in the shape of a ball is disposed in a through opening of a cylindrical receiving region of the first housing part. An axially displaceable locking sleeve with an internal locking surface located externally of the receiving region enables the radial displacement of the locking element into the locked or released positions. A coupling sleeve of the manually operated tool can be inserted into the receiving region of the first housing part with recesses or depressions matched to the outside surface of the one or more locking elements.

While a specific embodiment of the invention has been shown and described in detail to illustrate the inventive principles, it will be understood that the invention may be embodied otherwise without departing from said principles.

DETAILED DESCRIPTION OF THE INVENTION

Figure 1:
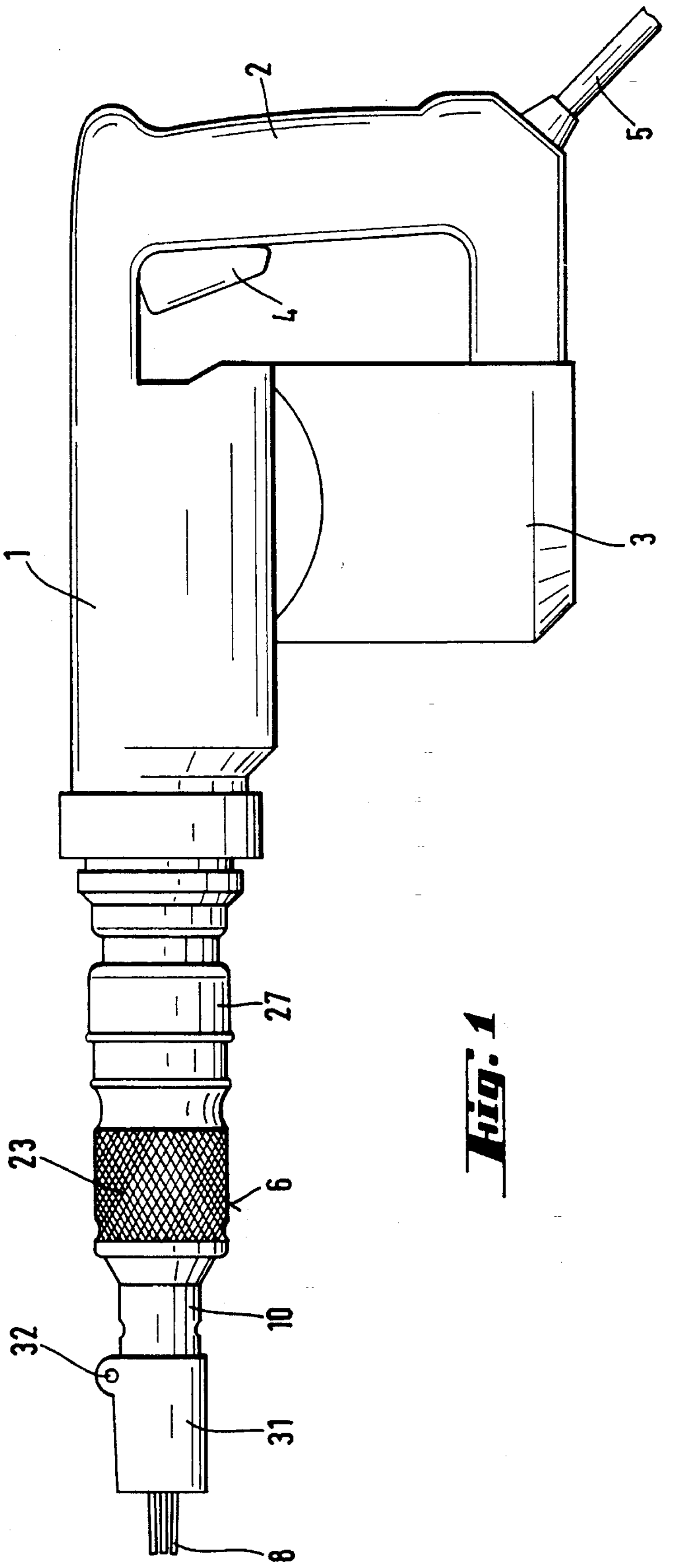
FIG. 1 is a side elevational view of a manually operated tool for chipping material from a surface embodying the present invention.
Figure 2:
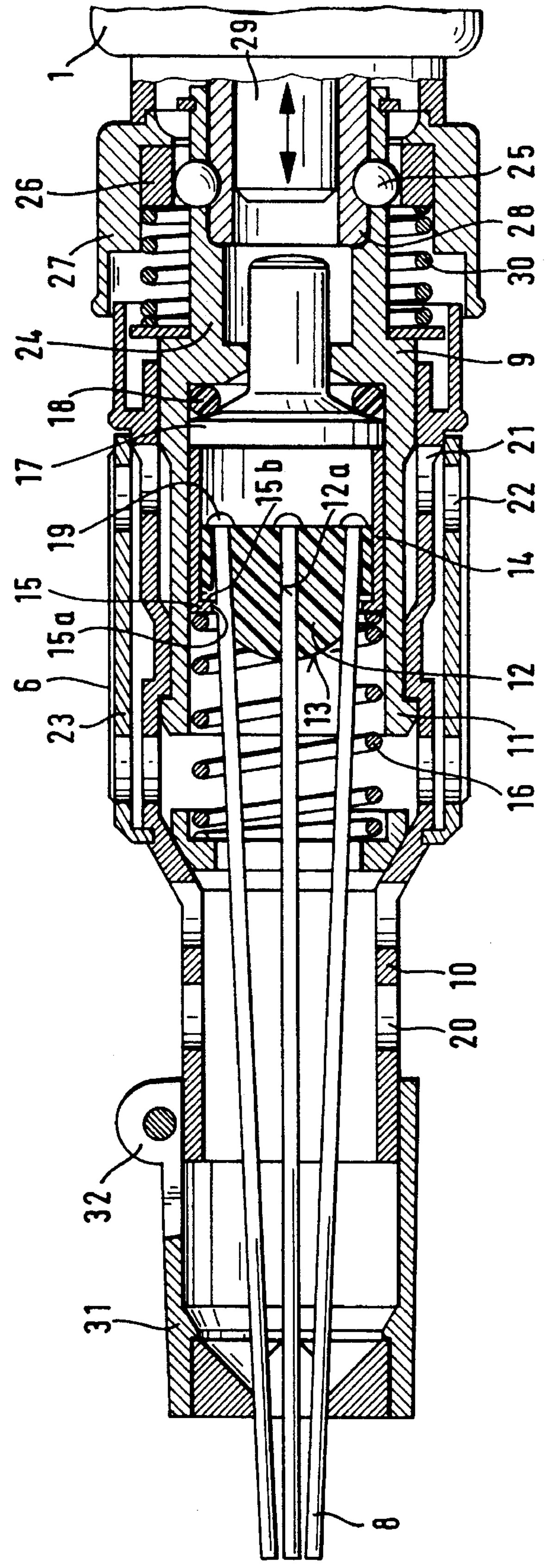
FIG. 2 an enlarged sectional view of a portion of the tool shown in FIG. 1 and illustrating the striking mechanism of the tool.

In FIGS. 1 and 2 a manually-operated tool for chipping material from surfaces is shown and comprises a housing 1 having a leading end at the left as shown in FIG. 1 and a trailing end at the right. Further, the various parts within the housing 1 have a leading end located to the left and a trailing end located to the right, such as viewed in FIG. 2. The housing 1 has a handle 2 at its trailing end. A drive motor 3, not shown in detail, is located within the housing 1 and the motor is controlled by an actuation switch 4 positioned in the handle. The electric current supply is provided to the handle of the manually operated tool through a cable 5.

A sleeve 23 with a gripping area 6 is located adjacent to the leading end of the housing 1 and the sleeve at least partially surrounds a first housing part 9 and a second housing part 10, both extending in the axial direction, that is, in the leading end trailing end direction. An axially displaceable guide sleeve 14 is located in the housing 1 within the first housing part 9 and the guide sleeve has a base 15 at its leading end with an opening 15a extending through the base. The base extends radially inwardly from the sleeve. A compression spring 16 presses at its trailing end against the base 15 and through the guide sleeve 14 against the anvil 17 opposite to the striking direction of the tool which is towards the leading end. Anvil 17 is also located in the first housing part 9 and is axially displaceable and pressed by the compression spring 16 via the guide sleeve 14 against a dampening ring 18 in the form of an O-ring.

A needle cage 12 is positioned inside the guide sleeve 14 and has a number of through-holes or bores 12*a* through which needle-type chisels or cutters 8 extend. Needle cage 12 is freely axially displaceable between a stop shoulder 15*b* formed by the base 15 of the guide sleeve 14 and the anvil 17. The needle cage 12 has a axially projecting section 13 at its leading end and the projecting section has a cross section extending transversely of the axial direction of the chisels 8 which is smaller than the cross section of the opening 15a in the base 15 of the guide sleeve 14.

The first housing part 9 is connected to the second housing part 10 in a coupling-like manner by a bayonet lock 11 at a location where the second housing part 10 at least partially encloses the first housing part 9.

Within the second housing part 10, a leading end of the first housing part 9 bears against a cone-shaped inside surface of the second housing part. The leading end of the first housing part 9 forms a stop surface for the leading end of the compression spring 16.

The trailing ends of the needle-type chisels 8 have needle heads 19, as shown in FIG. 2 positioned at the trailing end of the needle cage 12. Venting openings 20, 21, 22 are formed in the second housing part 10 and in the sleeve 23 and provide sufficient venting of the blow direction side internal space in the region of both first and second housing parts 9, 10. Air is displaced from inside the first housing part 9 towards the outside during the axial displacement of the guide sleeve 14 or the needle cage 12, or air is aspirated from outside the housing into the first housing part 9. This affords a cooling effect counteracting the heating of the parts within the housing parts 9, 10.

An axially displaceable clamping piece 31 is located in the leading end region of the second housing part 10 affording an adjustment of the extent of the axial projection of the needle chisels 8 from the leading end of the housing. The clamping piece 31 can be placed in fixed connection with the second housing part 10 by a clamping device 32 laterally enclosing the leading end region of the second housing part 10.

The two housing parts 9 and 10 and in particular the first housing part 9, can be placed in connection with the housing 1 of the manually operated tool by a rapid clamping device in the form of a ball catch coupling. Accordingly, the first housing part 9 has a receiving region 24 in the form of a hollow cylinder towards its trailing end. Receiving region 24 has two radially extending through openings for receiving and guiding two locking elements 25 in the shape of balls. The receiving region 24 is laterally enclosed by an axially displaceable locking sleeve 27 which effects a radial displacement of the locking elements 25 into a locked position or a released position by an appropriately shaped internal locking surface member 26. The receiving region 24 of the first housing part 9 is fitted over a coupling sleeve 28 having recesses at its outside surface matched to the locking elements 25. An axially displaceable hammer 29 is located within the coupling sleeve 28. The locking sleeve 27 is pressed into the locking position by a spring element 30.

While a specific embodiment of the invention has been shown and described in detail to illustrate the inventive principles, it will be understood that the invention may be embodied otherwise without departing from said principles.

We claim:

1. Manually operated tool for chipping material from a surface comprises a housing 1 extending axially between a leading end and a trailing end, a plurality of axially elongated needle-type chisels (8) each having a leading end and a trailing end with the leading ends projecting from the leading end of said housing, a needle cage (12) having a leading end and a trailing end located within said housing, and an anvil (17) having a leading end and a trailing end located within said housing adjacent the trailing end of said cage, said anvil being axially displaceable within said housing against the counteracting force of a compression spring (16) having a leading end and a trailing end and abutting said housing at the leading end thereof, a hammer (29) located within said housing and arranged to strike the trailing end of said anvil (17) and advance said anvil in the axial direction, said hammer (29) being displaceable within said housing in the axial direction of said needle-type chisels (8), said needle cage (12) having a plurality of bores extending therethrough in the axial direction of said chisels, said needle cage being enclosed and guided within an axially extending guide sleeve (14) disposed between said anvil and said compression spring, said compression spring (15) forcing said guide sleeve against the leading end of said anvil, and said needle cage being freely axially displaceable within said guide sleeve between the leading end of said anvil and a stop shoulder **(15*b*)** formed at a leading end of said guide sleeve.

2. Manually operated tool, as set forth in claim 1, wherein said stop shoulder is located at said housing (1).

3. Manually operated tool, as set forth in claim 1, wherein said guide sleeve has a leading end and a trailing end and said stop shoulder **(15*b*)** is formed on the leading end of said guide sleeve.

4. Manually operated tool, as set forth in claim 3, wherein said guide sleeve has an inside surface, an annular base (15) projecting inwardly from the inside surface of the said guide sleeve, said annular base (15) forming an opening **(15*a*) at the leading end of said guide sleeve, and said base (15) forms said stop shoulder (15*b*)**.

5. Manually operated tool, as set forth in claim 4, wherein said needle cage (12) has an axially extending projecting section (13) at the leading end of said needle cage extending through the opening **(15*a*) in said base (15) and said projecting section (13) has a cross section transverse to the axial direction of said chisels (8) smaller than the cross section of said opening (15*a*) in said base (15)**.

6. Manually operated tool, as set forth in one of claims 1 to 5, wherein said needle cage (12) is formed of plastics material.

7. Manually operated tool, as set forth in one of claims 1 to 5, wherein said housing (1) comprises a first housing part (9) and a second housing part (10) coupled to one another.

8. Manually operated tool, as set forth in claim 7, wherein said first housing part (9) and second housing part (10) are coupled together by a bayonet lock (11).

9. Manually operated tool, as set forth in claim 8, wherein said second housing part (10) laterally encloses at least an axially extended portion of said first housing part (9) and said bayonet lock (11) comprises inwardly extending projections on said second housing part (10) cooperating with stops on said first housing part.

* * * * *